R. L. NEUBERT.

TRAVELING HOIST.

APPLICATION FILED DEC. 29, 1921.

Reissued Feb. 28, 1922.

15,295.

4 SHEETS—SHEET 1.

Inventor

Richard L. Neubert

By Cyrus Rehr

Attorney

R. L. NEUBERT.

TRAVELING HOIST.

APPLICATION FILED DEC. 29, 1921.

Reissued Feb. 28, 1922. 15,295.

4 SHEETS—SHEET 2.

Inventor

Richard L. Neubert

By Cyrus Keller

Attorney

R. L. NEUBERT.
TRAVELING HOIST.
APPLICATION FILED DEC. 29, 1921.
Reissued Feb. 28, 1922. 15,295.
4 SHEETS—SHEET 3.
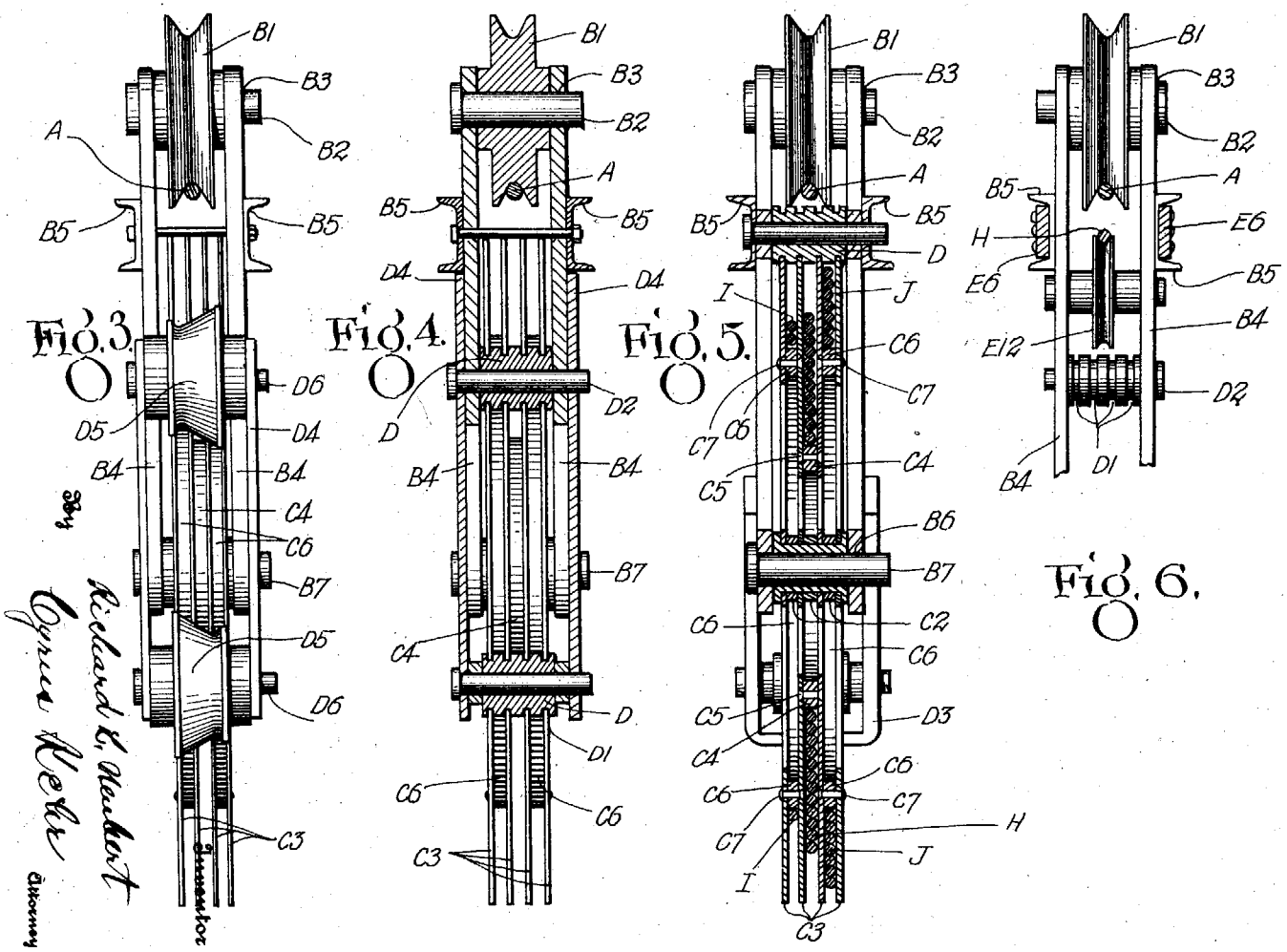
Inventor
Richard L. Neubert
By Cyrus Keller
Attorney R. L. NEUBERT.
TRAVELING HOIST.
APPLICATION FILED DEC. 29, 1921.
Reissued Feb. 28, 1922.
15,295.
4 SHEETS—SHEET 4.
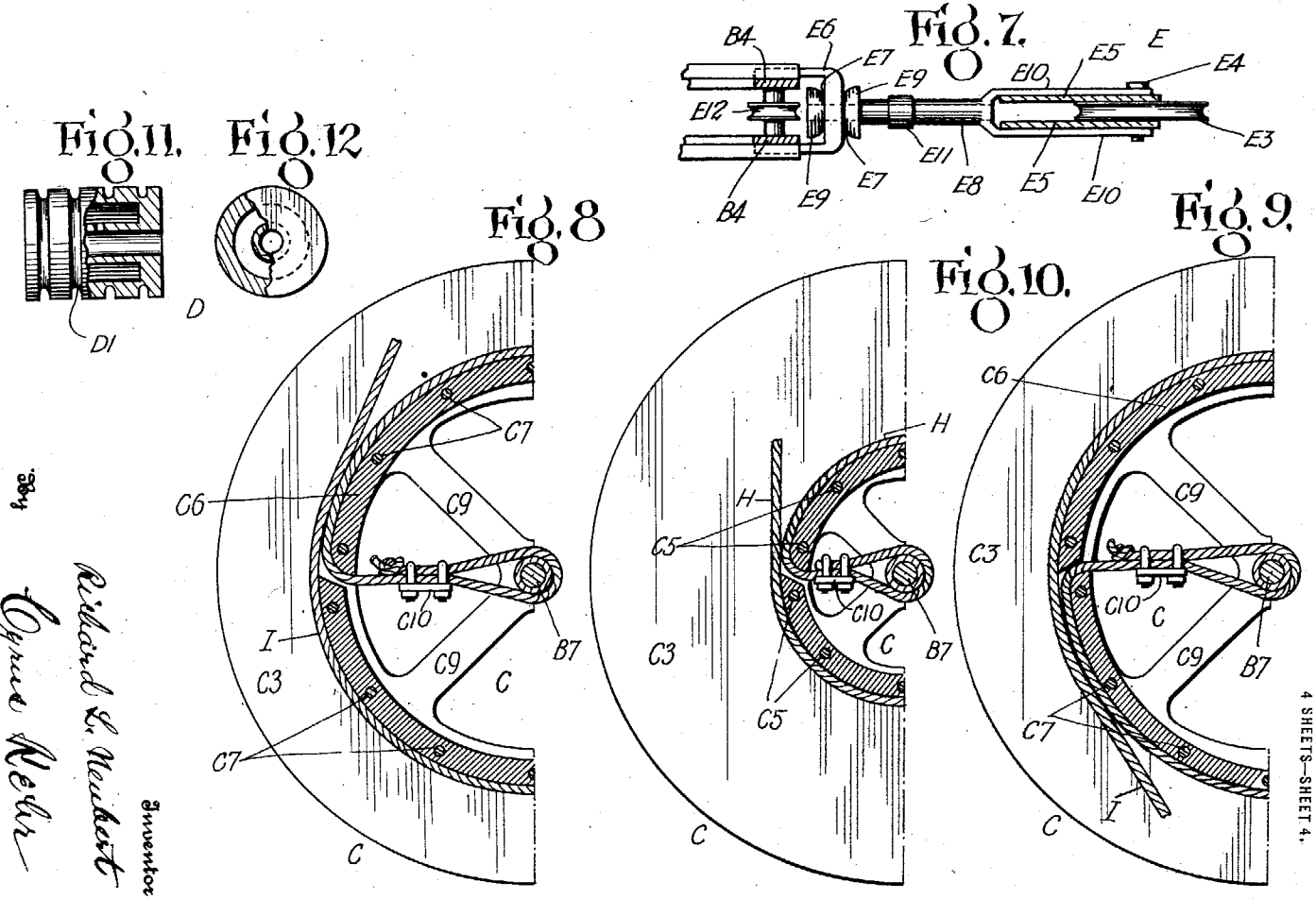
Inventor
Richard L. Neubert
By Cyrus Keller
Attorney

UNITED STATES PATENT OFFICE.

RICHARD L. NEUBERT, OF KNOXVILLE, TENNESSEE.

TRAVELING HOIST.

15,295. Specification of Reissued Letters Patent. Reissued Feb. 28, 1922.

Original No. 1,392,785, dated October 4, 1921, Serial No. 329,695, filed October 10, 1919. Application for reissue filed December 29, 1921. Serial No. 525,745.

*To all whom it may concern:*

Be it known that I, RICHARD L. NEUBERT, a citizen of the United States, residing at Knoxville, in the county of Knox and State of Tennessee, have invented a new and useful Improvement in Traveling Hoists, of which the following is a specification, reference being had to the accompanying drawing.

My improvement relates particularly to hoisting and carrying mechanism wherein a cable or wire rope or similar member forms an elevated track on which is supported a depending carriage which is made to travel on said track by means of ropes or cables leading to a station at or in the direction of one end of said track and being there connected with drums or windlasses, a cable or rope depending from the carriage and serving as a "load-line" or picking-up-line which is raised and lowered to handle the loads which the apparatus is to transport.

One object of the invention is to provide such an apparatus adapted to raise and transport heavy loads over a relatively extended range, both longitudinal and lateral. For example, the apparatus is intended to collect saw-logs scattered over an extended surface and deliver them on railway cars or elsewhere. For this service, an extremely strong equipment is required; but strength must be attained with the least possible weight of the traveling part of the equipment, for said part of the equipment is usually supported by a long cable supported only at its ends. On account of the lateral range necessary and the lateral oscillation during carrying, special features must be embodied in the traveling part of the equipment. It is a further object of my invention to provide such features. A further object of the invention is to so control ropes or cables as to prevent their twisting and overlapping and consequent kinking and entangling.

In the accompanying drawings,

Fig. 3 is an upright section on the line, 3—3, of Fig. 2, looking toward the right;

Fig. 4 is a section on the line, 4—4, of Fig. 2, looking toward the right;

Fig. 5 is a section on the line, 5—5, of Fig. 2, looking toward the right;

Fig. 6 is a section on the line, 6—6, of Fig. 2, looking toward the left;

Fig. 7 is a horizontal section on the line, 7—7, of Fig. 1;

Fig. 8 is a section between an outer two of the disks of the multiple pulley;

Fig. 9 is a similar section between the other outer two disks of said pulley;

Fig. 10 is a section between the two middle disks of said pulley;

Fig. 11 is an elevation, partially in section, of one of the grooved rollers for staying the edges of the disks of the multiple pulley;

Fig. 12 is an end view, partially in section, of the same rollers.

Figure 1:
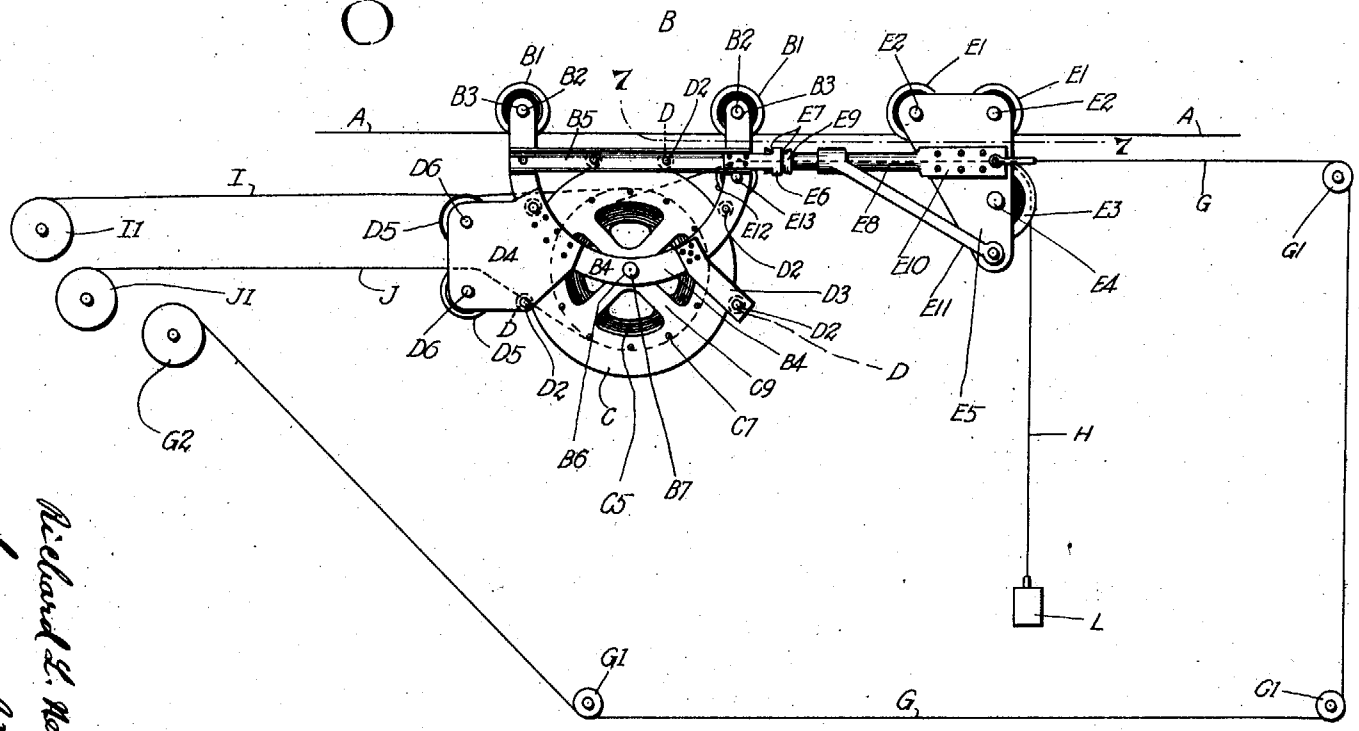
Fig. 1 is a side elevation illustrating an apparatus embodying my improvement, a part of this fugure being in diagram.
Figure 2:
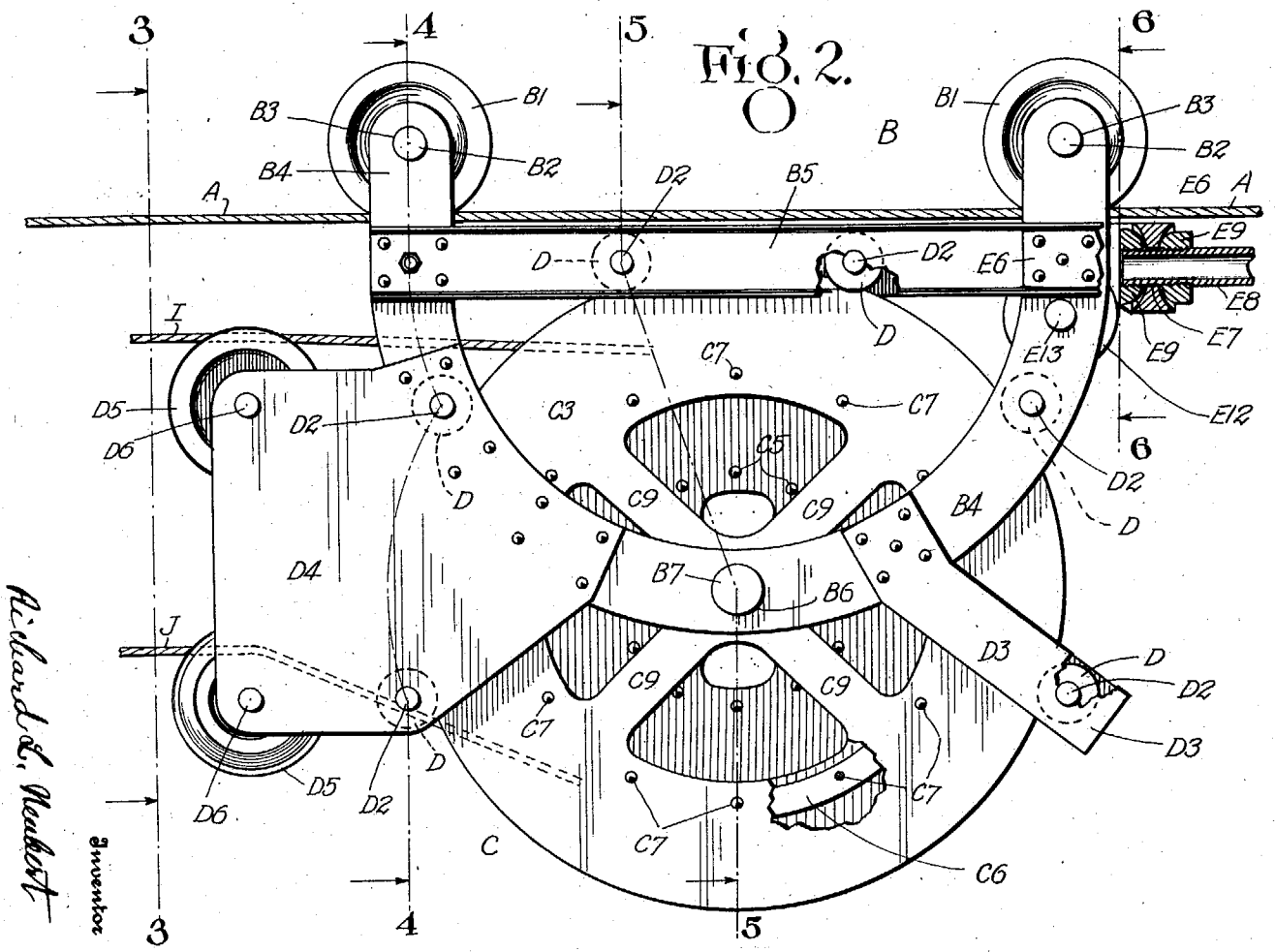
Fig. 2 is a side elevation on a larger scale illustrating the main part of the carriage, parts being broken away.

Referring to said drawings, A, is the elevated track upon which the carriage, B, travels. Said track is ordinarily a wire cable of ample strength and of sufficient length to permit operating over a considerable area. For logging this cable is sometimes as much as twenty-five hundred feet long. The ends of this cable are attached to firm supports at suitable elevations above the ground, as is well known. The body or main part of the carriage comprises two grooved wheels, $B^1$, each having an axle, $B^2$, which is horizontal and transverse to the course of the cable. Each end of each of said axles rests in a bearing, $B^3$, formed in the adjacent upper end of a U-shape frame member, $B^4$. A horizontal frame member, $B^5$, extends across each U-shape member and has its ends secured to the ends of the U-shape member a little below the wheels, $B^1$.

In the lower part of each of the U-shape members is a bearing, $B^6$. An axle, $B^7$, extends horizontally through said two bearings and forms a support for a multiple pulley, C. Said pulley comprises a bushing, $C^1$, spacing rings, $C^2$, surrounding the bushing, four sheet metal disks, $C^3$, separated from each other by said spacing rings. A spacing ring, $C^4$, is located between two metal disks, $C^3$, and is concentric with the axis of the axle, $B^7$, and said ring is secured to said disks by means of rivets or bolts, $C^5$. Spacing rings, $C^6$, of larger diameter are placed between the first and second and the third and fourth disks and each of said rings is secured to the adjacent disks by means of bolts or rivets, $C^7$. The thickness of the spacing rings, $C^4$ and $C^6$, is approximately equal to the thickness of the cables to be applied to said pulley, in order that the coils of each cable must rest upon each other and not side by side. This prevents entangling and wedging and consequent cutting. Six staying rollers, D, each having four circumferential grooves, $D^1$, are applied to the peripheries of the disks, $C^3$, to stay the disks against lateral bending, each of the grooves of said rollers receiving the edge of one of said disks. Two of said rollers are supported on axles, $D^2$, extending horizontally through the horizontal frame members, $B^5$. Another two of said rollers are supported on horizontal axles, $D^2$, extending through the U-shape members, $B^4$. Another of said rollers is supported on an axle, $D^2$, which rests in a U-shape yoke, $D^3$, which has its arms extending across the pulley, C, and overlapping and secured to the U-shape members, $B^4$, by bolts or rivets or otherwise. The sixth of said rollers is supported on a horizontal axle, $D^2$, which is supported in two extension plates, $D^4$. Said plates are upright and located opposite each other and overlap the adjacent parts of the U-shape members and are suitably secured to said members, as by means of bolts or rivets. Between the plates, $D^4$, are two grooved guide pulleys, $D^5$, each having an axle, $D^6$, resting in said plates.

At the right of the U-shaped member, $B^4$, is the articulated extension, E, of the carriage. Said extension comprises two grooved rollers, $E^1$, resting on the track cable, A, and having axles, $E^2$, and a guide pulley, $E^3$, having an axle, $E^4$, and parallel upright plates, $E^5$, located at opposite sides of the cable, A, and supporting the axles, $E^2$ and $E^4$. A horizontal fork or clevis, $E^5$, has its arms extending across and secured to the outer, upright, side faces of the frame members, $B^5$. The fork extends horizontally toward the carriage extension, E, and has in its right hand portion a horizontal bearing, $E^7$, through which extends a horizontal tube, $E^8$, which is smaller than the bearing. At each side of the bearing, $E^7$, a retaining member, $E^9$, is applied around the tube. In the form shown in the drawings, these retaining members are nuts, the faces of the fork at the bearing, $E^7$, being made concave and the adjacent faces of the nuts being made convex. Thus the tube is left free to turn on its axis and laterally in the bearing, $E^7$. Thus a universal joint is formed between said tube and the main frame of the carriage. The right hand end of said tube is split along an upright plane, and the two arms, $E^{10}$, thus formed are made to overlap the outer side faces of the plates, $E^5$, and said arms are secured to said plates by riveting or otherwise. A forked brace, $E^{11}$, has one end secured to the tube, $E^8$, while its other end is secured to the lower ends of the plates, $E^5$. The function of this brace is to give rigidity to the extension of the carriage.

A grooved roller, $E^{12}$, having an axle, $E^{13}$, is seated between the U-shape members, $B^4$, at the right of the tube, $E^8$, the axle, $E^{13}$, being seated in the U-shape members at the proper elevation to bring the upper part of said pulley to the level of the bore of said tube.

A rope, G, is attached to the right hand end of the carriage extension, E, and goes thence over guide pulleys, $G^1$, to a drum, $G^2$. The rope, H, which is to carry a load, L, extends upward to and across the guide pulley, $E^3$, and thence horizontally and leftward between the plates, $E^5$, and through the tube, $E^8$, and over the guide pulley, $E^{12}$, and thence between the two middle disks, $C^3$, to the ring, $C^4$. There the rope is secured in any desired manner. A rope, I, has one end extending between an outer two of the disks, $C^3$, to the ring, $C^6$, which is located between said disks, and said rope is there suitably secured. Said rope extends thence leftward horizontally over the upper guide pulley, $D^5$, and to the drum, $I^1$, to which said rope is attached. A rope, J, extends between the other outer two of said disks and to the ring, $C^6$, which separates said disks. There said rope is suitably secured; and said rope extends thence leftward over the lower of the two guide pulleys, $D^5$, and to the drum, $J^1$, to which the rope is attached. In assembling the apparatus, either the rope, I, or the rope, J, is wound on the pulley, C, while the other rope is not wound or is wound in the opposite direction. Turning the drum, $I^1$, for drawing the rope, I, (if that rope is wound on the pulley, C, and the rope, H, is at the time unwound) will cause the rotation of the pulley, C, in the proper direction to wind the rope, H, on said pulley, whereby the load, L, will be lifted. To lower the free end of the rope, H, to receive or discharge a load, the drum, $I^1$, is to be released and the drum, $J^1$, rotated.

One form for securing the cables, I and J, and the load-line, H, is shown in Figs. 8, 9 and 10. The spacing rings, $C^4$ and $C^6$, are each provided with a gap, $C^8$, through which the cable which is applied to said ring is passed. Between said rings and the axle, $B^7$, portions of the disks are cut out to leave spokes, $C^9$. Through the openings thus formed, the cables can be reached and brought around the axle and secured by clamps, $C^{10}$.

By simultaneously drawing the ropes, I and J, by winding them on their drums and releasing the rope, G, the entire carriage is drawn toward the left, without turning the multiple pulley, C. By releasing the ropes, I and J, under restraint and winding the rope, G, on the drum, $G^2$, the entire carriage is drawn toward the right on the track, A.

It is to be observed that the drums, $I^1$, $J^1$, and $G^2$, may be closely grouped for convenient control, as is well known in this art.

The tube, $E^8$, and the guide rollers, $E^3$, and $E^{12}$, are brought as close as feasible to the track cable, A, in order that lateral swaying of the load on the rope, H, or lateral range of the rope to take a load may take place with ease and with least strain upon the extension, E, of the carriage. In other words, the aim is to give the depending part of the rope, H, and the carriage extension, E, freedom for pendulum movement on the cable independently of lateral swaying of the main part of the carriage, so that that pendulum movement can take place without compelling corresponding lateral movement of the main part of the frame, and also so that any lateral strain placed upon the main part of the frame through the ropes, G, I, and J, or otherwise, will not be transmitted to the carriage extension, E. Furthermore, the universal joint whereby the two sections of the carriage are articulated allows the two sections to adapt themselves to varying curvature of the track cable.

It is to be observed that the various features of my improved carriage are suited to the attainment of strength with lightness. Attention is specially invented to the combination of the disks, $C^3$, and the rings, $C^4$ and $C^6$, and the grooved rollers, D, whereby the edges of said disks are stayed. These features make for lightness. In the absence of the grooved rollers, D, the disks and other parts of the pulley, C, would have to be much heavier. The forming of the universal joint between the main part of the carriage and the carriage extension also makes for lightness. If the two sections of the carriage were not thus articulated, the carriage would have to be made much heavier in order to fit it to resist the strains which would be put upon it.

Attention is also directed to the fact that each of the cables, G, I and J, has both ends secured to parts which allow no twisting and whereby the cables are controlled to prevent kinking. Thus a serious defect in similar apparatus now in use is avoided.

I claim as my invention,

1. In an apparatus of the nature described, the combination of a carriage comprising an extension and means for articulating the extension to the main part of the carriage and guiding the below-mentioned load-line, wheels on the carriage adapted to travel on an elevated track, a multiple pulley, a load-line attached to said pulley and extending along said articulating and guiding means, two cables oppositely applied to said pulley for rotating the pulley, and a line leading to the carriage opposite said pulley cables for drawing the carriage in opposition to said cables substantially as described.

2. In an apparatus of the nature described, the combination with a carriage comprising wheels adapted to travel on an elevatel track, of a multiple pulley having disks, rollers for staying the peripheries of the disks, a load-line attached to said pulley, two cables oppositely applied to said pulley for rotating it, and a line leading to the carriage opposite said pulley cables for drawing the carriage in opposition to said cables, substantially as described.

3. In an apparatus of the nature described, the combination of a carriage comprising an extension and means for articulating the extension to the main part of the carriage and guiding the below-mentioned load-line, a multiple pulley located in the main part of the carriage, cables oppositely attached to said pulley for rotating the latter in either direction, a line leading to the carriage opposite said pulley cables for drawing the carriage in opposition to said cables, and a load-line having one end attached to said pulley and extending thence along said articulating and guiding means and across the carriage extension and thence downward, substantially as described.

4. In an apparatus of the nature described, the combination of a carriage comprising an extension and means comprising a universal joint for articulating the extension to the main part of the carriage and guiding the below-mentioned load-line, a multiple pulley located in the main part of the carriage, cables oppositely attached to said pulley for rotating the latter in either direction, a line leading to the carriage opposite said pulley cables for drawing the carriage in opposition to said cables, and a load line having one end attached to said pulley and extending thence along said articulating and guiding means and across the carriage extension and thence downward, substantially as described.

5. In an apparatus of the nature described, the combination with a carriage comprising an extension articulated to the main part of the carriage, a multiple pulley located in the main part of the carriage and having disks, rollers for staying the peripheries of the disks, cables oppositely attached to said pulley for rotating the latter in either direction, a line leading to the carriage opposite said pulley cables for drawing the carriage in opposition to said cables, and a load-line having one end attached to said pulley and extending thence across the carriage extension and thence downward, substantially as described.

6. In an apparatus of the nature described, the combination with a carriage comprising an extension articulated to the main part of the carriage by a universal joint, a multiple pulley located in the main part of the carriage and having disks, rollers for staying the peripheries of the disks, cables oppositely attached to said pulley for rotating the latter in either direction, a line leading to the carriage opposite said pulley cables for drawing the carriage in opposition to said cables, and a load-line having one end attached to said pulley and extending thence across the carriage extension and thence downward, substantially as described.

7. In an apparatus of the nature described, the combination with a carriage comprising wheels adapted to travel on an elevated track, of a multiple pulley having disks, rollers located at the peripheries of the disks and having grooves receiving said peripheries, a load-line attached to said pulley, two cables oppositely applied to said pulley for rotating it, and a line leading to the carriage opposite said pulley cables for drawing the carriage in opposition to said cables, substantially as described.

8. In an apparatus of the nature described, the combination with a carriage comprising wheels adapted to travel on an elevated track, of a multiple pulley comprising an axle, four disks, rings separating said disks at chosen distances from the axle and having gaps, a load-line extending into the space between two of said disks and through the gap in the ring which is in said space and said line being secured within said ring, two cables, one extending into one and the other into the other of the inter-disk spaces and each cable extending through the gap in the adjacent ring and being secured within said ring, said two cables being oppositely applied for rotating the pulley in opposite directions, substantially as described.

9. In an apparatus of the nature described, the combination with a carriage comprising wheels adapted to travel on an elevated track, of a multiple pulley comprising an axle, four disks, rings separating said disks at chosen distances from the axle and having gaps, a load-line extending into the space between two of said disks and through the gap in the ring which is in said space and said line being secured within said ring, two cables, one extending into one and the other into the other of the inter-disk spaces and each cable extending through the gap in the adjacent ring and being secured to the axle within said ring, said two cables being oppositely applied for rotating the pulley in opposite directions, substantially as described.

10. In an apparatus of the nature described, the combination with a carriage comprising wheels adapted to travel on an elevated track, of a multiple pulley comprising an axle, four disks, each having openings between the axle and the below-mentioned spacing rings, spacing rings separating said disks at chosen distances from the axle and having gaps, a load-line extending into the space between two of said disks and through the gap in the ring in said space and secured within said ring, two cables, one extending into one and the other into the other of the inter-disk spaces and each cable extending through the gap in the adjacent ring and secured within said ring, said two cables being oppositely applied for rotating the pulley in opposite directions, substantially as described.

11. In an apparatus of the nature described, the combination with a carriage comprising wheels adapted to travel on an elevated track, of a multiple pulley comprising an axle, four disks, each having openings between the axle and the below-mentioned spacing rings, spacing rings separating said disks at chosen distances from the axle and having gaps, a load-line extending into the space between two of said disks and through the gap in the ring in said space and secured within said ring, two cables, one extending into one and the other into the other of the inter-disk spaces and each cable extending through the gap in the adjacent ring and secured to the axle within said ring, said two cables being oppositely applied for rotating the pulley in opposite directions, substantially as described.

12. In an apparatus of the nature described, the combination of a carriage comprising U-shaped members and wheels located at the ends of the arms of said members and adapted to travel on an elevated track, a multiple pulley located between and supported by said members and extending upward into the space between the arms of said members, a load-line attached to said pulley, two cables oppositely applied to said pulley for rotating it, and a line leading to the carriage opposite said pulley cables for drawing the carriage in opposition to said cables, substantially as described.

13. In an apparatus of the nature described, the combination of a carriage comprising an extension in which is a guide pulley, means for articulating the extension to the main part of the carriage and guiding the below-mentioned load-line, a multiple pulley located in the main part of the carriage, cables oppositely attached to said pulley for rotating the latter in either direction, a line leading to the carriage opposite said pulley cables for drawing the carriage in opposition to said cables, and a load-line having one end attached to said pulley and extending thence along said articulating and guiding means and across the pulley in the carriage extension and thence downward, substantially as described.

14. In an apparatus of the nature described, the combination with a carriage comprising wheels adapted to travel on an elevated track, of a multiple pulley on the main part of the carriage, a carriage extension articulated to the main part of the carriage by a universal joint and comprising a guide pulley and a tube on which the universal joint is formed, and a cable extending from said guide pulley through said tube to the multiple pulley, substantially as described.

15. In an apparatus of the nature described, the combination of a carriage comprising a main part and an extension, means for articulating the extension to the main part and guiding the below-mentioned load-line, wheels applied to said main part and said extension and adapted to travel on an elevated track, a multiple pulley on the main part of the carriage, a guide pulley in the carriage extension, a load-line extending over the guide pulley of the carriage extension and along said articulating and guiding means to the multiple pulley on the main part of the carriage, two cables oppositely applied to the multiple pulley for rotating said pulley, and a line leading to the carriage opposite said pulley cables for drawing the carriage in opposition to said cables, substantially as described.

16. In an apparatus of the nature described, the combination of a carriage comprising an extension and means for articulating the extension to the main part of the carriage, a multiple pulley in the main part of the carriage, a guide pulley between the multiple pulley and said articulating means and a guide pulley in said extension, the upper parts of said guide pulleys being at approximately the height of said articulating means, wheels on the carriage adapted to travel on an elevated track, two cables oppositely applied to said pulley for rotating the pulley, a load-line attached to said multiple pulley and extending horizontally over said two guide pulleys and thence downward, and a line leading to the carriage opposite said pulley cables for drawing the carriage in opposition to said cables, substantially as described.

In testimony whereof I have signed my name, this 24th day of December, in the year one thousand nine hundred and twenty-one.

RICHARD L. NEUBERT.